United States Patent
Dawe et al.

(10) Patent No.: US 11,216,263 B2
(45) Date of Patent: Jan. 4, 2022

(54) POLICY-BASED AUTOMATED GENERATION OF SOFTWARE-DEFINED STORAGE DEPLOYMENTS

(71) Applicant: EMC IP Holding Company LLC, Hopkinton, MA (US)

(72) Inventors: Trevor H. Dawe, Riverview (CA); Sean R. Gallacher, Moncton (CA); Eric Young, Alexandria, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/862,786

(22) Filed: Apr. 30, 2020

(65) Prior Publication Data

US 2021/0342137 A1 Nov. 4, 2021

(51) Int. Cl.
*G06F 3/06* (2006.01)
*H04L 29/08* (2006.01)
(Continued)

(52) U.S. Cl.
CPC ............ *G06F 8/61* (2013.01); *H04L 67/1097* (2013.01); *H04L 67/32* (2013.01); *H04L 67/34* (2013.01)

(58) Field of Classification Search
CPC ..... H04L 67/1097; H04L 67/32; H04L 67/34; H04L 67/02; H04L 67/10; H04L 8/61; G06F 8/61; G06F 3/067; G06F 3/0631; G06F 3/0608; G06F 3/0659; G06F 3/0689; G06F 6010/06; G06F 8/60; G06F 9/455; G06F 3/0604; G06Q 10/06
See application file for complete search history.

(56) References Cited

U.S. PATENT DOCUMENTS 7,945,640 B1 * 5/2011 VanTine .................. G06F 3/067
709/217
10,078,552 B2 9/2018 De Keyser et al.
(Continued)

OTHER PUBLICATIONS

Pan et al. A robust method based storage aggregator model for grid dispatch, 5 pages (Year: 2015).*

*Primary Examiner* — Thuy Dao
(74) *Attorney, Agent, or Firm* — Ryan, Mason & Lewis, LLP

(57) ABSTRACT

Methods, apparatus, and processor-readable storage media for policy-based automated generation of software-defined storage deployments are provided herein. An example computer-implemented method includes obtaining, from a user, a software-defined storage deployment request comprising request attributes; determining a software-defined storage deployment policy applicable to the request by processing the request attributes in connection with a set of software-defined storage deployment policies; executing, in a given order, multiple rules contained within the determined software-defined storage deployment policy, wherein executing each of the multiple rules comprises modifying at least a portion of a list of storage resources associated with the user by performing one or more actions as prescribed by the rule in conjunction the request attributes; generating a software-defined storage deployment plan based on the execution of the multiple rules; and performing at least one automated action based on the generated software-defined storage deployment plan.

20 Claims, 17 Drawing Sheets

(51) Int. Cl.
*G06F 12/02* (2006.01)
*G06F 12/00* (2006.01)
*G06F 11/10* (2006.01)
*G06F 8/61* (2018.01)

(56) References Cited

U.S. PATENT DOCUMENTS

| | | |
|---|---|---|
| 10,379,951 B2 | 8/2019 | De Keyser et al. |
| 2011/0238672 A1* | 9/2011 | Agarwala ............ H04L 67/1097 707/748 |
| 2014/0244724 A1* | 8/2014 | Patrick ................ H04L 67/1097 709/203 |
| 2015/0089015 A1* | 3/2015 | Rosset ................ H04L 67/1097 709/215 |
| 2018/0060744 A1* | 3/2018 | Achin ....................... G06N 5/02 |
| 2019/0012235 A1 | 1/2019 | De Keyser et al. |
| 2019/0026135 A1 | 1/2019 | Chen et al. |
| 2019/0227717 A1* | 7/2019 | Fang .................... G06F 3/0631 |

* cited by examiner

VxFlex OS Deployment Policy

```
{
  "name": "VxFlexOSDeploymentPolicy",
  "description": "policy for deploying VxFlex",
  "rules": [
    "FilterNonMatchingDeviceTypes",
    "FilterDevicesInUse",
    "FilterDevicesInvalidSectorSize",
    "FilterDevicesMinimumSize",
    "FilterDevicesMaximumSize",
    "SelectResources",
    "AssignSoftware"
  ]
}
```

301

The policy is realized in code through a series of maps

Mappings in Code

```
storageStackNameToDeploymentPolicyMap = {
  "VxFlexOS": "VxFlexOSDeploymentPolicy"
} policyNamesToCodeMap = {
  "VxFlexOSDeploymentPolicy": policy.VxFlexOSDeploymentPolicy
} rulesNamesToCodeMap = {
  "FilterNonMatchingDeviceTypes": policy.rules.FilterNonMatchingDeviceTypes,
  "FilterDevicesInUse": policy.rules.FilterDevicesInUse,
  "FilterDevicesInvalidSectorSize": policy.rules.FilterDevicesInvalidSectorSize,
  "FilterDevicesMinimumSize": policy.rules.FilterDevicesMinimumSize,
  "FilterDevicesMaximumSize": policy.rules.FilterDevicesMaximumSize,
  "SelectResources": policy.rules.SelectResources,
  "AssignSoftware": policy.rules.AssignSoftware
}
```

Storage Deployment Request

```
Target Size: 100GB
Disk Type: SSD
Storage Stack: VxFlexOS
Inventory:
- Server1
  [/dev/sda,/dev/sdb,/dev/sdc,/dev/sdd]
- Server2
  [/dev/sda,/dev/sdb,/dev/sdc,/dev/sdd]
- Server3
  [/dev/sda,/dev/sdb,/dev/sdc,/dev/sdd]
```
401

Mappings in Code

```
storageStackDeploymentPolicyMap = {
  "VxFlexOS": "VxFlexOSDeploymentPolicy"
} policyNamesToCodeMap = {
  "VxFlexOSDeploymentPolicy": ...
}
                                    Step 1 ruleNamesToCodeMap = {
  "FilterNonMatchingDiskType":
    ...
}
```
303

Step 2

VxFlex OS Deployment Policy

```
{
  "name": "VxFlexOSDeploymentPolicy",
  "description": "Policy for deploying VxFlex",
  "rules": [
    ...
  ]
}
```
501

POLICY-BASED AUTOMATED GENERATION OF SOFTWARE-DEFINED STORAGE DEPLOYMENTS

FIELD

The field relates generally to information processing systems, and more particularly to storage in such systems.

BACKGROUND

Software-defined storage portfolios often face challenges with respect to unification and simplification. For example, each software-defined storage stack within such a portfolio has its own deployment process and installation footprint that can lead to improper and inconsistent resource utilization if carried out incorrectly. However, conventional storage deployment techniques are typically manual and error-prone, thereby often failing to unify or simplify software-defined storage deployments across a portfolio.

SUMMARY

Illustrative embodiments of the disclosure provide techniques for policy-based automated generation of software-defined storage deployments. An exemplary computer-implemented method includes obtaining, from at least one user, a software-defined storage deployment request comprising one or more request attributes, and determining a software-defined storage deployment policy applicable to the request by processing at least a portion of the one or more request attributes in connection with a set of software-defined storage deployment policies. The method also includes executing, in a given order, multiple rules contained within the determined software-defined storage deployment policy, wherein executing each of the multiple rules comprises modifying at least a portion of a list of storage resources associated with the at least one user by performing one or more actions as prescribed by the rule in conjunction at least a portion of the one or more request attributes. Further, the method additionally includes generating a software-defined storage deployment plan based at least in part on the execution of the multiple rules, and performing at least one automated action based at least in part on the generated software-defined storage deployment plan.

Illustrative embodiments can provide significant advantages relative to conventional storage deployment techniques. For example, challenges associated with unifying and simplifying deployments across a software-defined storage portfolio are overcome in one or more embodiments through automatically generating deployment plans based on sequential rule execution as part of executing a determined deployment policy.

These and other illustrative embodiments described herein include, without limitation, methods, apparatus, systems, and computer program products comprising processor-readable storage media.

BRIEF DESCRIPTION OF THE DRAWINGS

FIG. 3 through FIG. 14 show an example workflow in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
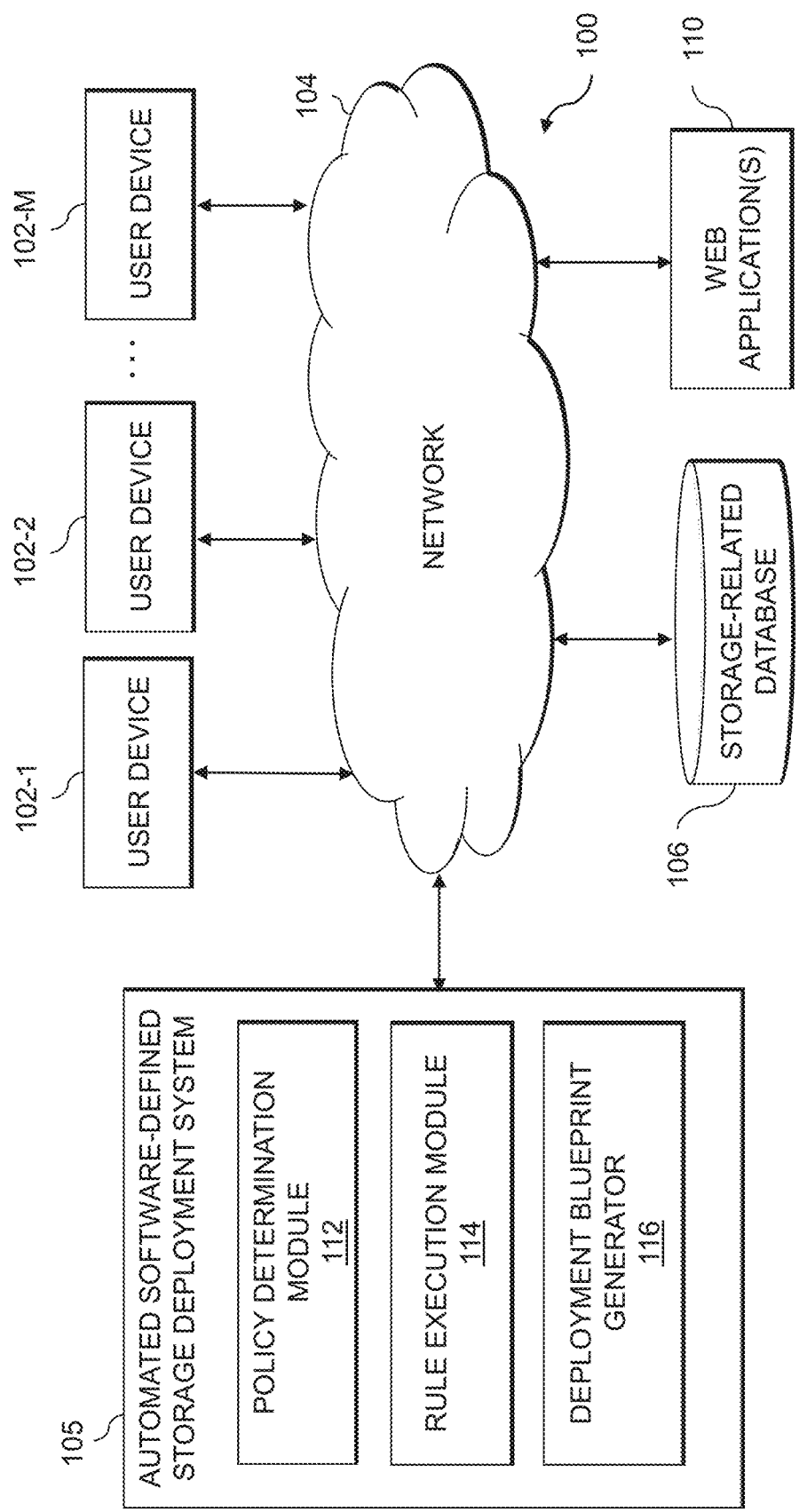
FIG. 1 shows an information processing system configured for policy-based automated generation of software-defined storage deployments in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated software-defined storage deployment system 105 and one or more web applications 110 (e.g., applications pertaining to requesting, managing, and/or implementing software-defined storage deployments).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." Additionally or alternatively, such devices can be associated with one or more storage systems (e.g., software-defined storage systems and/or portfolios).

Also, the user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated software-defined storage deployment system 105 can have an associated database 106 configured to store data pertaining to storage-related information, which comprise, for example, inventory information, storage resource information, storage utilization information, etc.

The database 106 in the present embodiment is implemented using one or more storage systems associated with the automated software-defined storage deployment system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated software-defined storage deployment system 105 can be input-output devices, which illustratively comprise keyboards, displays or other types of input-output devices in any combination. Such input-output devices can be used, for example, to support one or more user interfaces to the automated software-defined storage deployment system 105, as well as to support communication between the automated software-defined storage deployment system 105 and other related systems and devices not explicitly shown.

Also, the automated software-defined storage deployment system 105 in the FIG. 1 embodiment is assumed to be implemented using at least one processing device. Each such processing device generally comprises at least one processor and an associated memory, and implements one or more functional modules for controlling certain features of the automated software-defined storage deployment system 105.

More particularly, the automated software-defined storage deployment system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated software-defined storage deployment system 105 to communicate over the network 104 with the user devices 102, and illustratively comprises one or more conventional transceivers.

The automated software-defined storage deployment system 105 further comprises a policy determination module 112, a rule execution module 114, and a deployment blueprint generator 116.

It is to be appreciated that this particular arrangement of modules 112, 114 and 116 illustrated in the automated software-defined storage deployment system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for policy-based automated generation of software-defined storage deployments involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example automated software-defined storage deployment system 105 in computer network 100 will be described in more detail with reference to the flow diagram of FIG. 15.

Accordingly, at least one embodiment includes policy-based automated generation of software-defined storage deployments. Such an embodiment includes generating and implementing a policy-based solution for determining how software-defined storage should be installed, including resource selection and determining which software should be installed at which location(s). A deployment blueprint (more generally referred to herein as a deployment plan) generated by such a policy-based approach can then be consumed by a human or automation tool to perform the deployment and/or one or more other automated actions.

In order to facilitate layering of one or more software-defined file stacks on top of block storage, at least one embodiment includes generating and/or implementing a mechanism to determine the list of nodes and resources for performing deployment. Such a mechanism defines one or more policies and one or more rules for selecting the server(s) and disk(s) to facilitate automated deployment of one or more software-defined file stacks on top of block storage. It is also to be appreciated that one or more embodiments can be implemented in connection with and/or applicable to single software-defined storage stacks or the layering of multiple different software-defined storage stacks (e.g., file over block, block, file, etc.).

As such, and as further detailed herein, one or more embodiments include generating and implementing a policy-based approach that consumes storage class attributes (e.g., 1 terabyte (TB) of solid-state drive-based (SSD-based) block storage) and automatically generating a deployment blueprint for how software-defined storage should be deployed in response to a request. Such an embodiment includes leveraging information pertaining to the execution of policies that govern how software-defined storage is installed and deployed.

As used herein, a storage stack deployment policy guides decisions around deployment of a software-defined storage stack. Storage stack deployment policies can be composed of one or more of the following elements: name (e.g., a policy identifier that corresponds to purpose of the policy); description (e.g., details about what the policy does); and rules (e.g., an ordered list of rules that need to be executed sequentially to enforce the policy).

Accordingly, in one or more embodiments, a storage stack deployment policy is defined as containing an ordered set of rules that governs what actions the policy performs towards generating a deployment blueprint. Also, in such an embodiment, a deployment policy can utilize one or more of the following inputs: target size (e.g., the amount of requested storage capacity (e.g., 1 TB)); storage class attributes (e.g., disk type=SSD); storage stack name (e.g., an identifier indicating what software-defined storage stack to install); and inventory servers (e.g., a list of servers and disks (including names and sizes) that will be considered for the deployment of software-defined storage).

As output, a deployment policy will generate a deployment blueprint. A deployment blueprint, as used herein in connection with one or more embodiments, can include a snapshot and/or preview of what the deployment should look like and/or include, wherein such a preview can include one or more of the following: an identifier indicating what software-defined storage stack(s) to install; specific resources that need to be created (e.g., storage pools); specific attributes required for the software-defined storage stack(s) to be installed; what servers from the available inventory to use for deployment; what disks on the selected servers to use; what networking interfaces to use on the selected servers; and what software is to be installed on which of the selected servers.

Policy rules, as used herein, are independently executable and testable pieces of code that are each responsible for performing one or more fine-grained actions within and/or as part of a policy. By way merely of example, policy rules can perform, but are not limited to, the following: filtering (e.g., filtering resources from consideration (for the deployment blueprint) that may not meet one or more desired storage class attributes); validation (e.g., validating one or more policy inputs to ensure nothing is missing and/or to ensure inputs are received in the expected format); augmentation (e.g., resources (such as servers) may be augmented to include things such as what software should be installed thereon); and selection (e.g., selecting specific resources that will be used for deployment, such as what servers and/or disks to use, what network interface card to use, etc., wherein such selections can be based at least in part on best practices for the specific storage stack). Also, in at least one embodiment, each policy rule will take as input a set of nodes. It is to be appreciated that, as used herein, "nodes" and "servers" can be used interchangeably, and each node or server contains a number of one or more disks. Depending on the implementation of the rule, the rule will, for example, validate, filter, augment and/or perform selection algorithms against a given list of nodes, and return a modified list of nodes as output of the rule.

During policy execution, the list of rules for the policy are executed sequentially in the order in which they are defined in the policy. In one or more embodiments, based on the policy inputs of desired storage attributes, the policy rules will make decisions on how to filter, validate, augment, and/or select the inventory nodes to determine a set of nodes and/or resources that is optimal for deployment. Also, in at least one embodiment, the policy rules are chained together such that the output of one policy rule will be used as part of the input to the next policy rule in the sequence until all policy rules are executed. The result of such a process can include determining an optimal set of inventory nodes and resources on those nodes for installing and/or deploying the software-defined storage stack for which the policy applies.

With respect to policy and rule configuration, prior to execution of a policy, the policy is looked-up, for example, using a map structure of policy names to an executable code structure that contains the implementation for executing the policy. When a reference to the policy is obtained, the policy can be executed by processing inputs such as target size, storage class attributes, storage stack to be deployed, and inventory servers. When a policy is executed, the policy rules are looked-up, for example, using a map structure of rule names to an executable code structure that contains the implementation for executing the rule. When all of the rules are successfully looked-up by the policy, the first rule is executed using the inputs of inventory and one or more requested parameters. The output of the first rule is then passed as input to the following (second) rule.

When the final policy rule is executed, the list of remaining nodes will be used to create a deployment blueprint and returned as the output of the policy. If an error occurs during rule execution or invalid input is requested based on available inventory, one or more relevant errors will be returned instead of a blueprint.

Due to rules being independently executable, if additional rules have been implemented and/or added to the map of rule names, such rules can be added into the rules sequence to augment and/or change the policy. In addition, the existing rules sequence order can be changed in the policy file without requiring any additional code changes. Also, in one or more embodiments, a rule may be shared between multiple policies, maximizing reuse.

Figure 2:
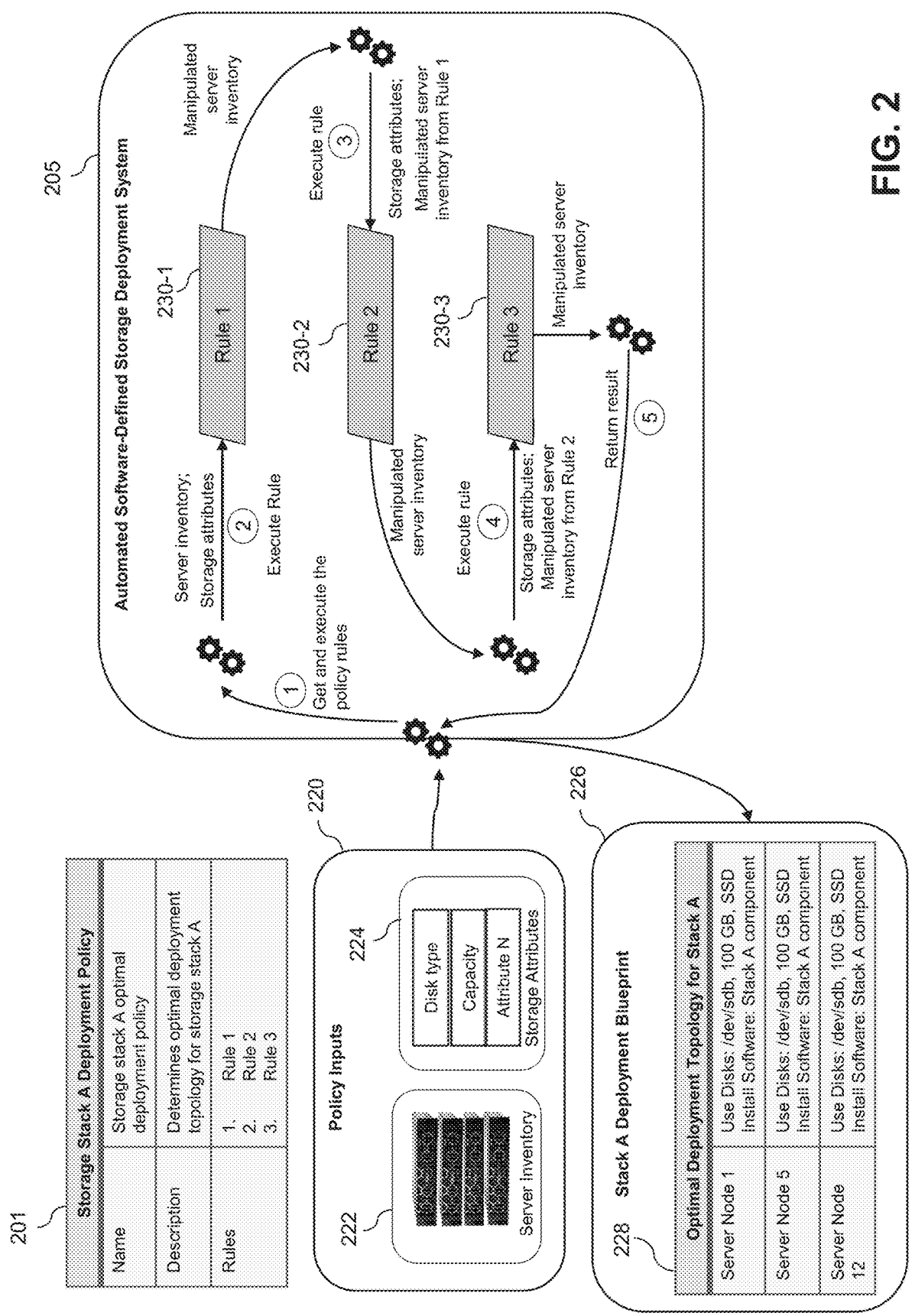
FIG. 2 shows an information processing system configured for policy-based automated generation of software-defined storage deployments in an illustrative embodiment.

FIG. 2 shows an information processing system configured for policy-based automated generation of software-defined storage deployments in an illustrative embodiment. By way of illustration, FIG. 2 depicts storage stack A deployment policy 201, which contains properties of a policy including the name of the policy, description of the policy, and an ordered list of rules that will be executed for the policy. Policy inputs 220 define the inputs that will be executed upon by the policy 201, including the server inventory 222, which includes server and disk information, and storage attributes 224, which include input from the user defining the type of storage, the capacity, and other attributes to operate upon during policy execution. Stack A deployment blueprint 226 depicts the final output of the policy execution, and contains the optimal deployment topology for stack A 228, which identifies and/or lists the servers and disks to use for deploying the storage stack.

As also illustrated in FIG. 2, automated software-defined storage deployment system 205 depicts the workflow for executing the example policy. In the workflow, step 1 retrieves the policy based on the given input, and step 2 begins execution of Rule 1 (230-1) by passing the server inventory and storage attributes as input to the rule. The output of the storage attributes and manipulated server inventory from Rule 1 (230-1) is used as input into Rule 2 (230-2). The procedure of passing output from Rule N to Rule N+1 is continued until the final rule (e.g., Rule 3

(230-3)) has executed. When all rules have been executed, step 5 returns a result which contains the stack A deployment blueprint 226.

As noted, for example, in connection with FIG. 2, a manipulated inventory from a final rule is a subset of the original inventory and contains the resources and details required for a deployment that satisfies the policy.

As further detailed below, FIG. 3 through FIG. 14 show an example workflow in an illustrative embodiment.

Figure 4:
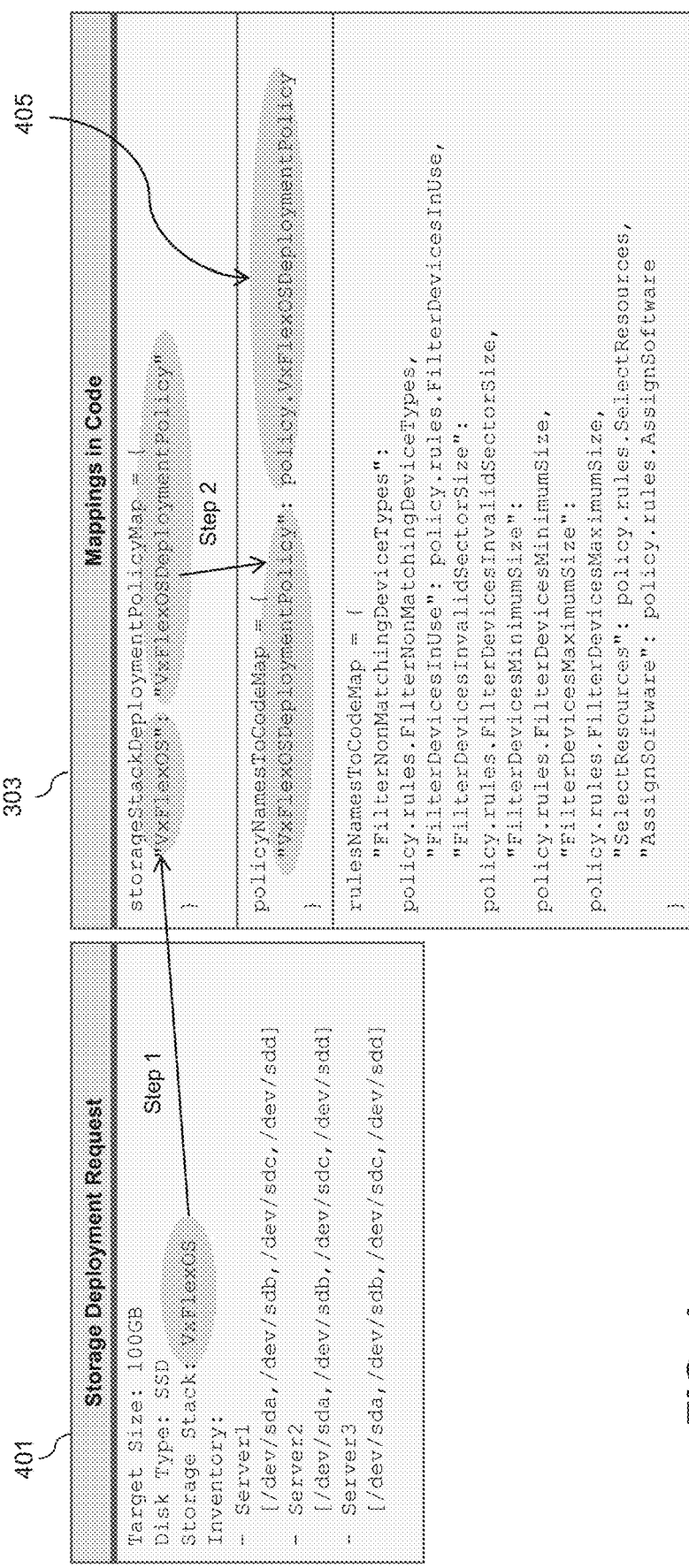

As depicted in FIG. 3, a policy 301 gets realized in code 303 through a series of maps. As depicted in FIG. 4, the policy implementation 405 to execute is determined from the code mappings 303 based on a storage deployment request 401. Specifically, in step 1, the deployment policy name that corresponds to the storage stack name in the request 401 is identified, and in step 2, the deployment policy implementation that corresponds to the deployment policy name is identified.

As depicted in FIG. 5, in step 1, the deployment policy implementation reads in the corresponding deployment policy file 501 and extracts a list of rule names 503 to be executed. In step 2, the deployment policy implementation looks-up the rule implementations corresponding to each of the rule names 503 defined in the policy file 501. If, for example, additional rules have been implemented and added to the ruleNamesToCodeMap, such rules can be added into the rules sequence 503 to augment and/or change the policy. In addition, the existing rules sequence order can be changed in the policy file 501 without requiring any additional code changes.

Figure 6:
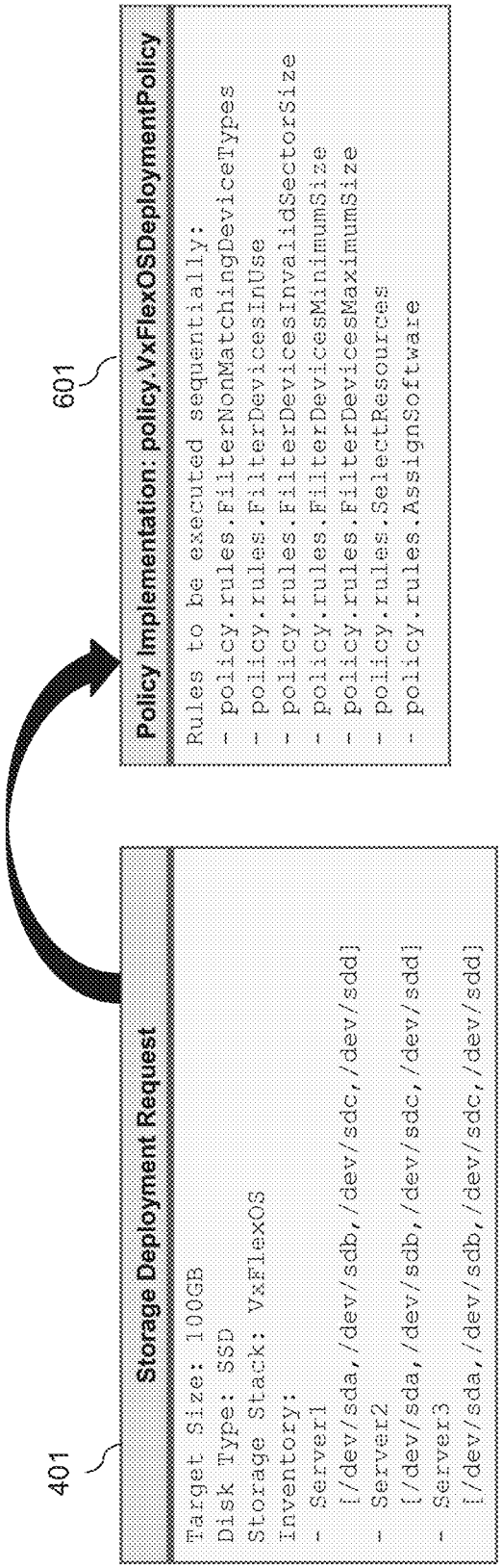

As depicted in FIG. 6, the storage deployment request 401 is passed into the policy implementation 601 for execution.

Figure 7:
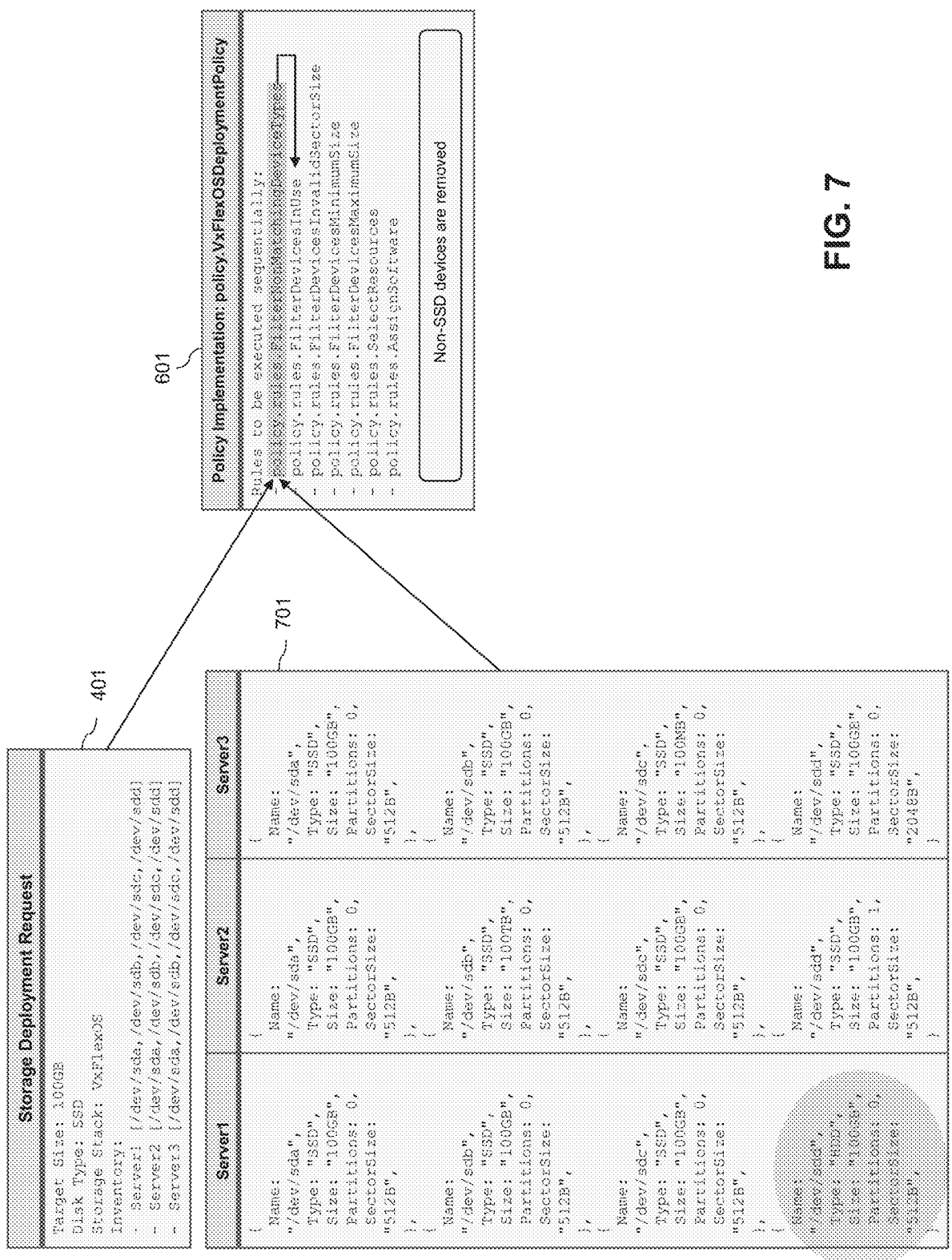

FIG. 7 through FIG. 13 show sequential execution of policy rules in an illustrative embodiment. As depicted in FIG. 7, the policy implementation 601 begins executing the rules sequentially by executing the first rule, which, in this example, includes removing non-SSD devices, such as highlighted in the collection of server resources 701.

As further detailed herein, each policy rule takes, as input, the original storage deployment request 401 and a list of nodes 701 to execute upon. The list of nodes 701 passed into the first rule is the full inventory from the original storage deployment request 401. Also, each policy rule performs one or more operations (e.g., validate, filter, augment, etc.) on the input set of nodes. The output of each rule is a potentially modified input list of nodes. Subsequently, this output list of nodes gets passed into the next rule in the policy implementation 601.

Figure 8:
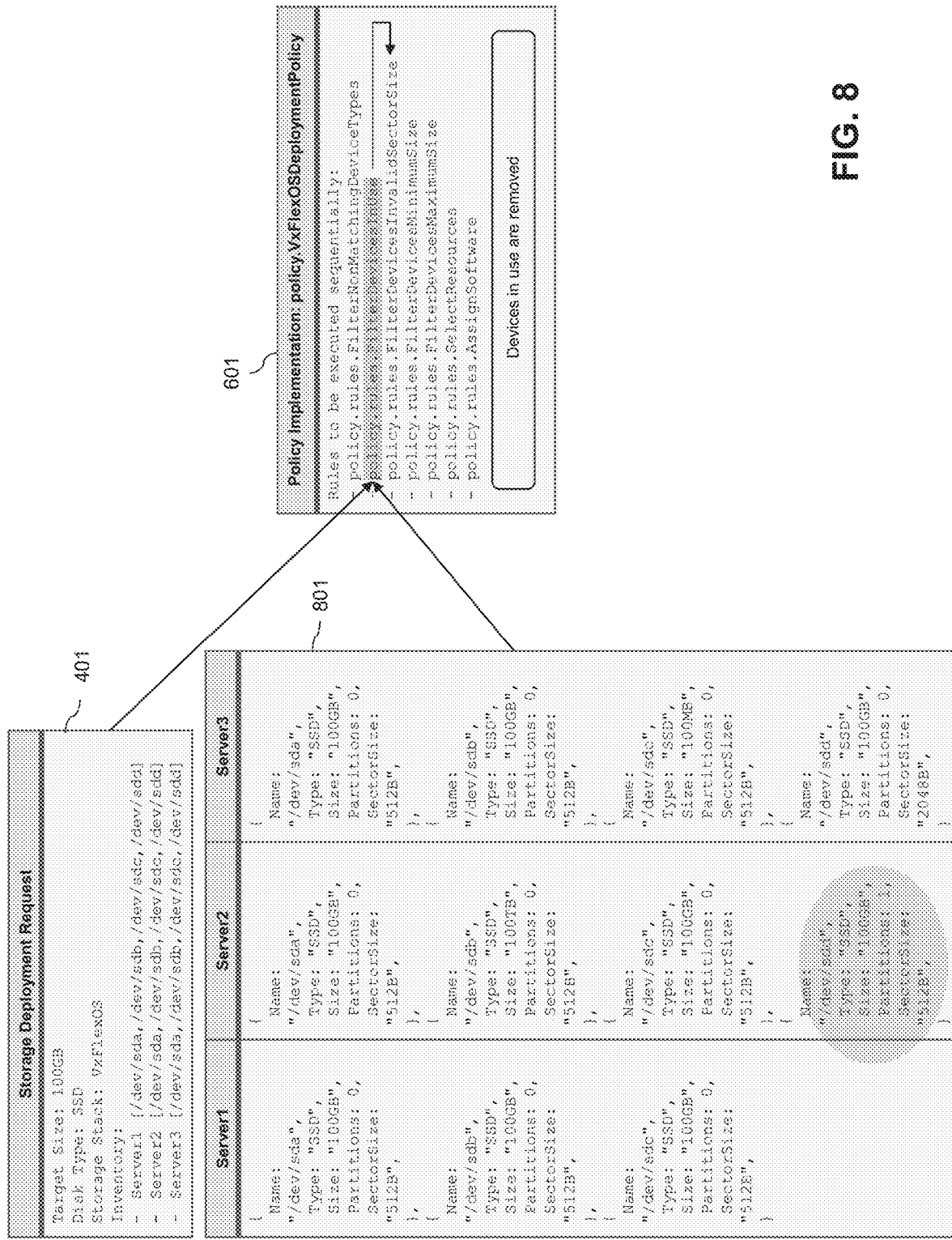

As depicted in FIG. 8, the policy implementation 601 executes the second rule, which, in this example, includes removing devices that are in-use, such as highlighted in the modified collection of server resources 801.

Figure 9:
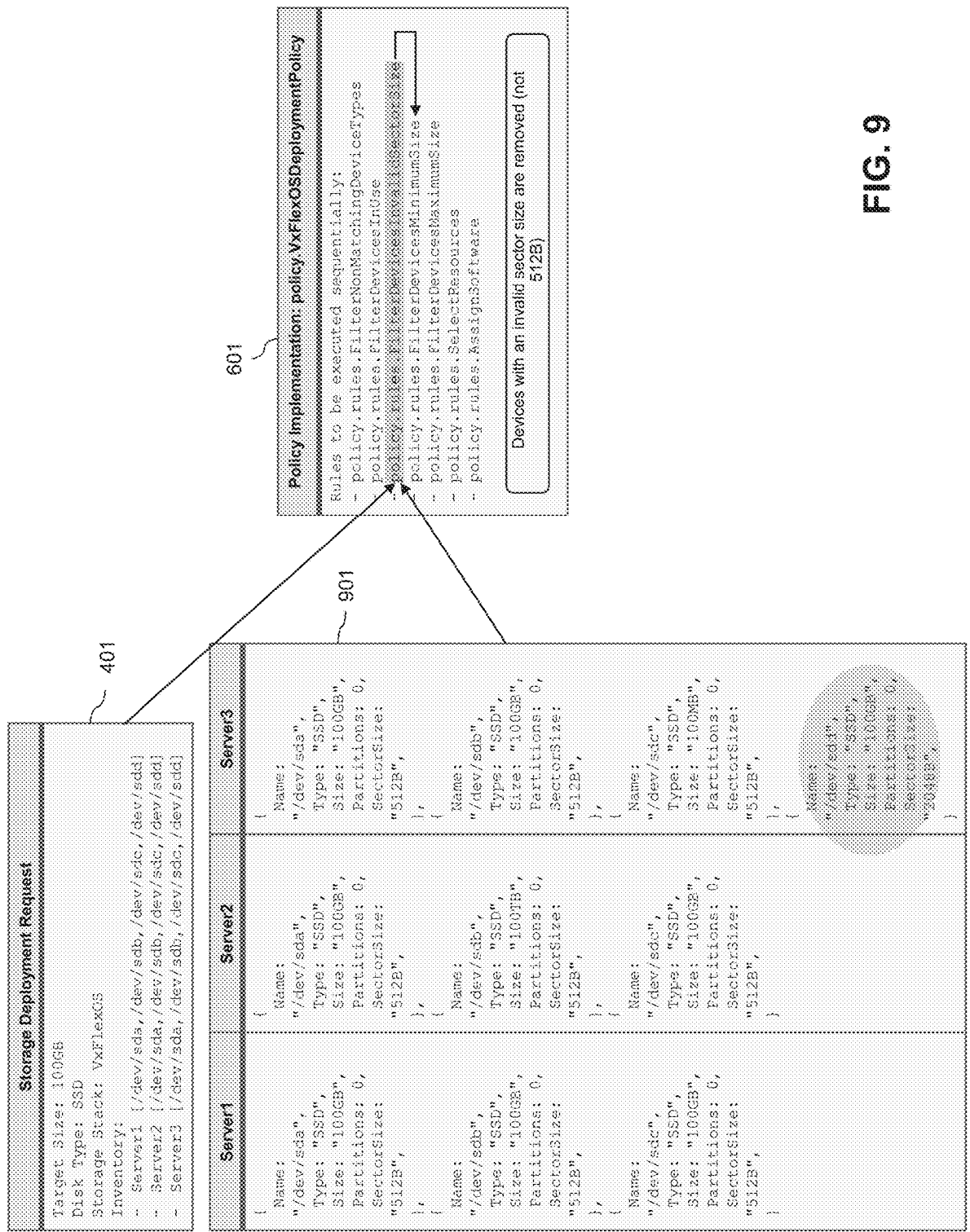

As depicted in FIG. 9, the policy implementation 601 executes the third rule, which, in this example, includes removing devices with an invalid sector size (e.g., not 512 bytes (B)), such as highlighted in the modified collection of server resources 901.

Figure 10:
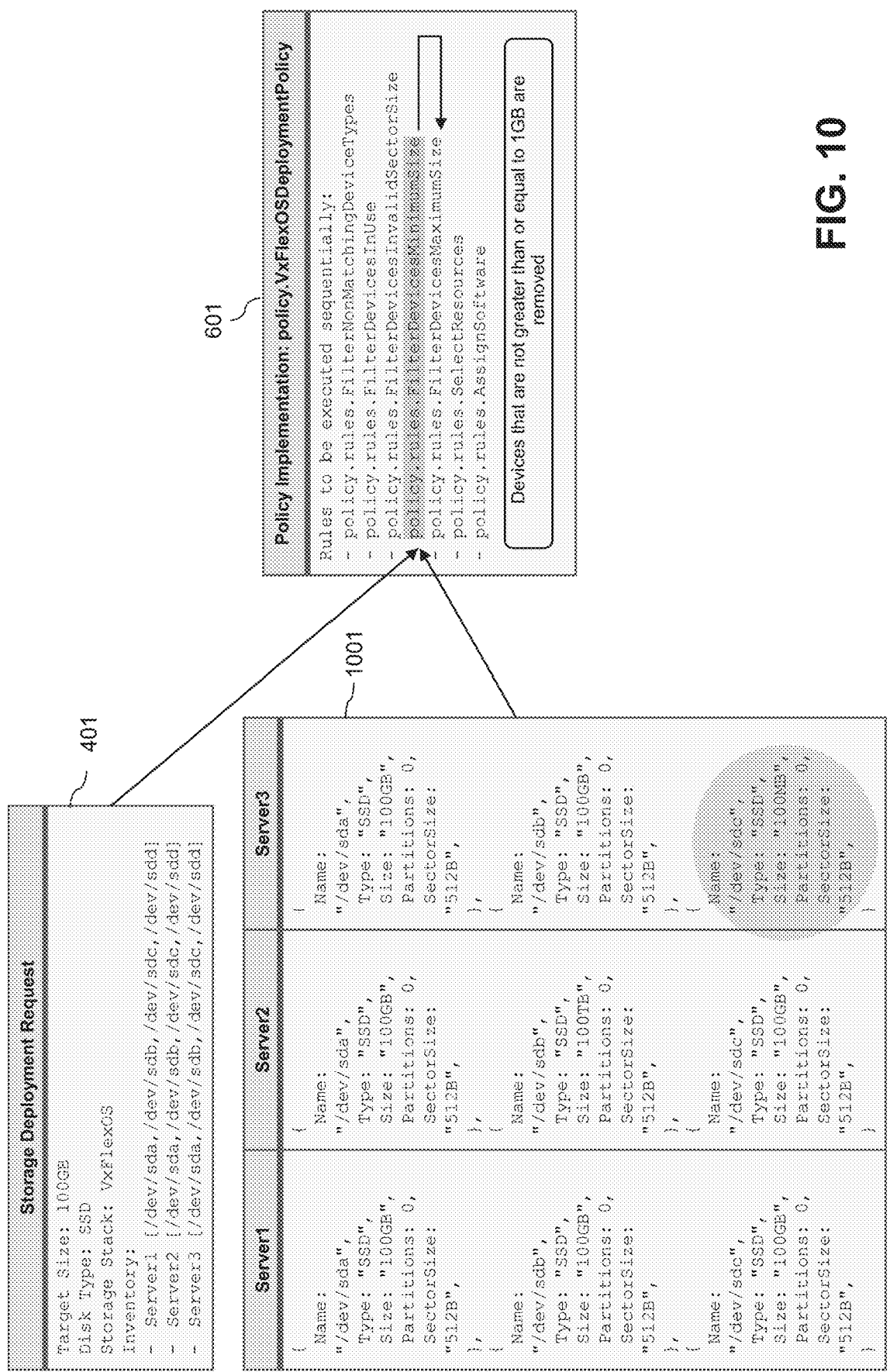

As depicted in FIG. 10, the policy implementation 601 executes the fourth rule, which, in this example, includes removing devices that are not greater than or equal to one gigabyte (GB), such as highlighted in the modified collection of server resources 1001.

Figure 11:
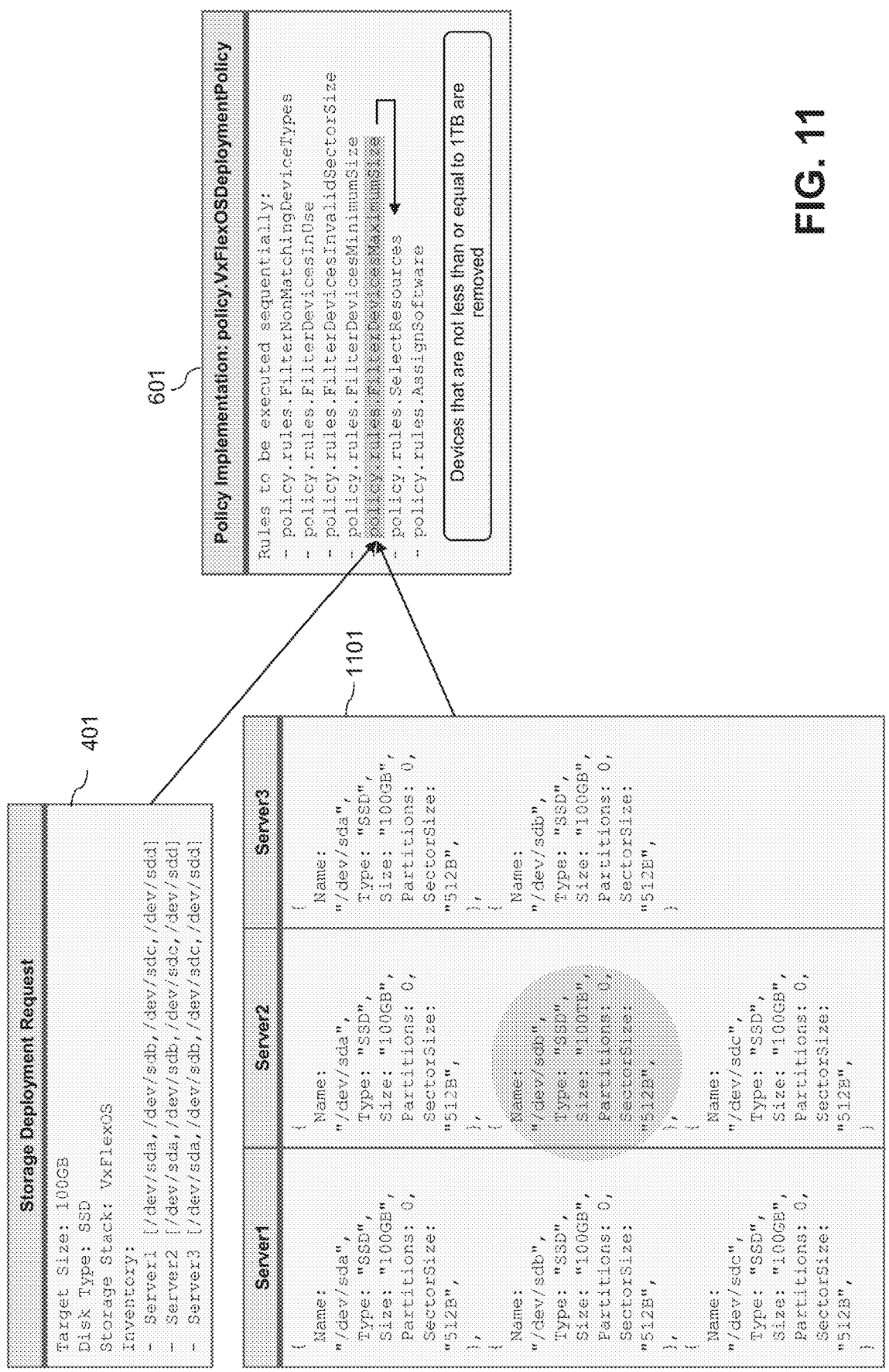

As depicted in FIG. 11, the policy implementation 601 executes the fifth rule, which, in this example, includes removing devices that are not less than or equal to one TB, such as highlighted in the modified collection of server resources 1101.

Figure 12:
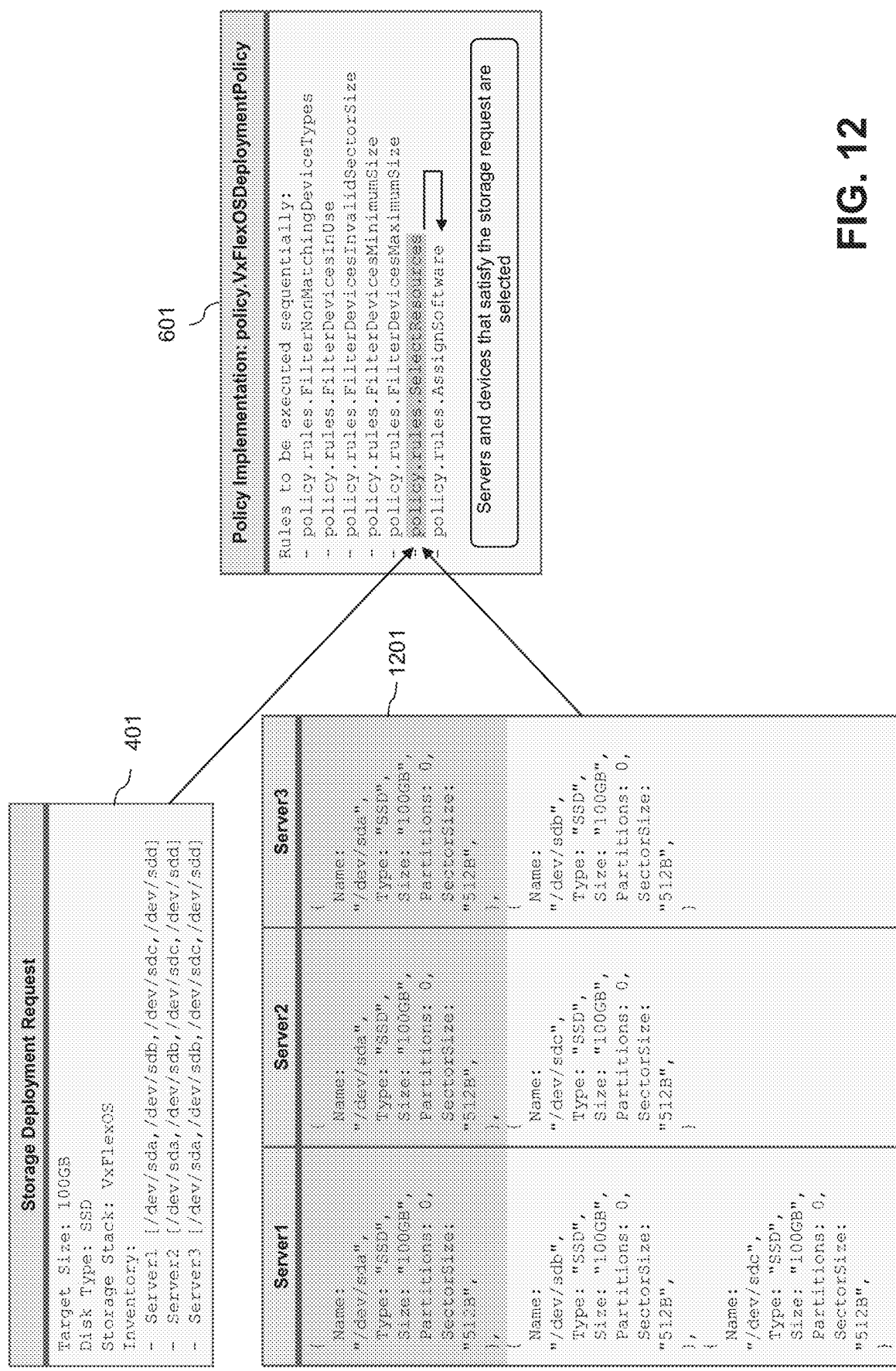

As depicted in FIG. 12, the policy implementation 601 executes the sixth rule, which, in this example, includes selecting the (remaining) servers and devices that satisfy the storage request, such as highlighted in the modified collection of server resources 1201. By way merely of example, one or more embodiments include selecting servers and/or devices using at least one rule-based algorithm in connection with storage stack best practices to satisfy the requested capacity.

Figure 13:
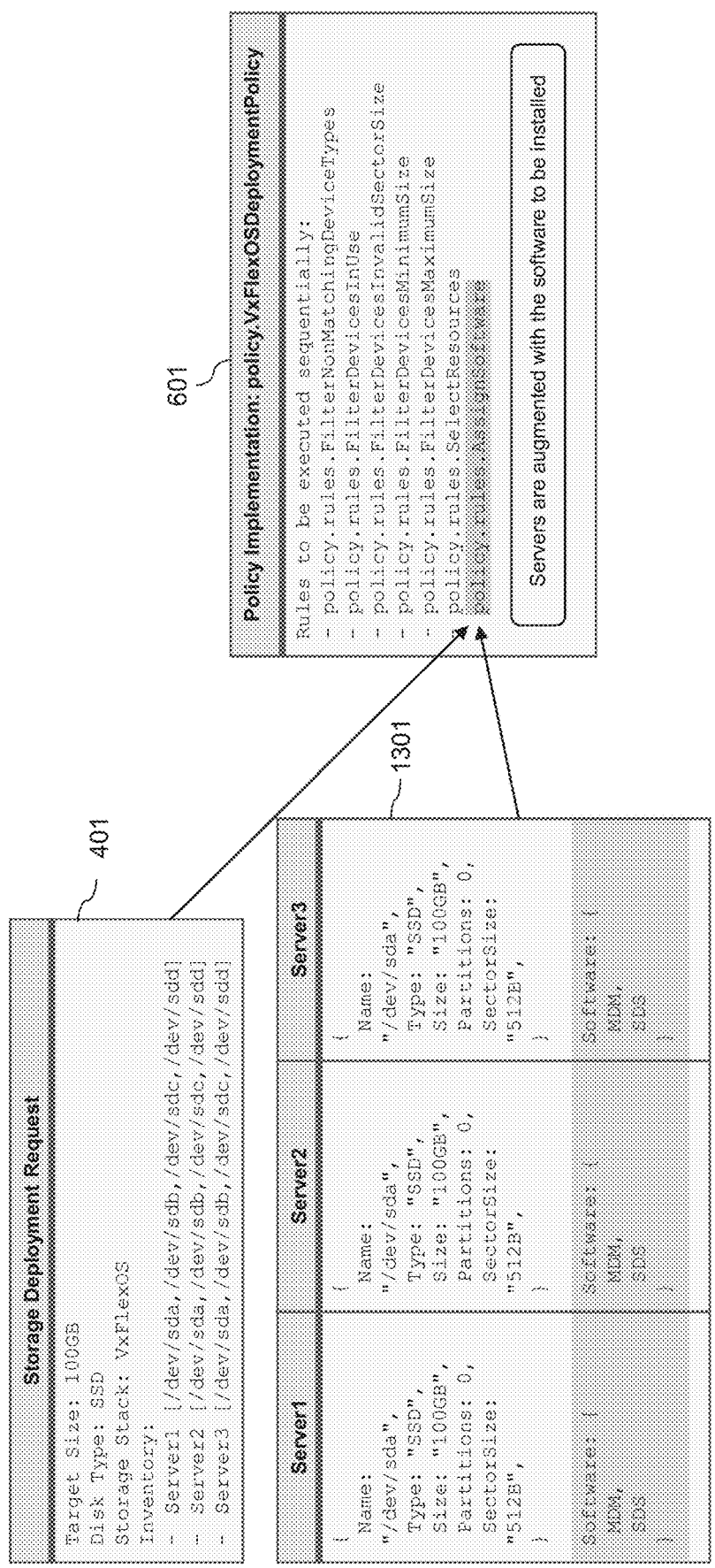

As depicted in FIG. 13, the policy implementation 601 executes the seventh rule, which, in this example, includes augmenting the selected servers and devices with software to be installed, such as highlighted in the modified collection of server resources 1301.

Figure 14:
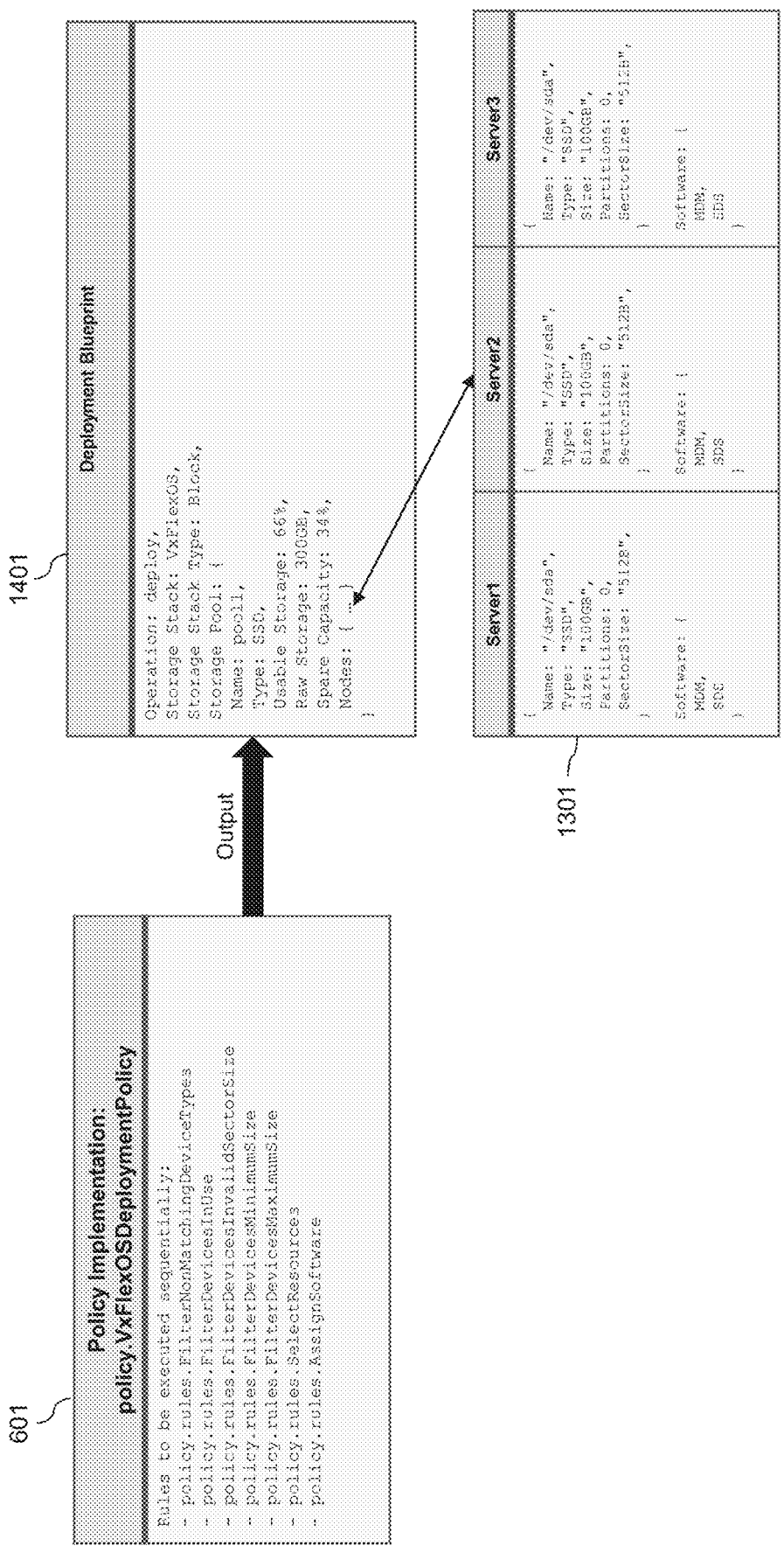

As depicted in FIG. 14, the policy implementation 601 takes the resulting node list 1301 from the final rule execution and uses it to populate the deployment blueprint 1401. Additionally, the policy implementation 601 populates the deployment blueprint 1401 with any other additional information required for deployment. In at least one embodiment, the deployment blueprint 1401 can be used by a human or one or more automated processes to perform the storage stack deployment.

Figure 15:
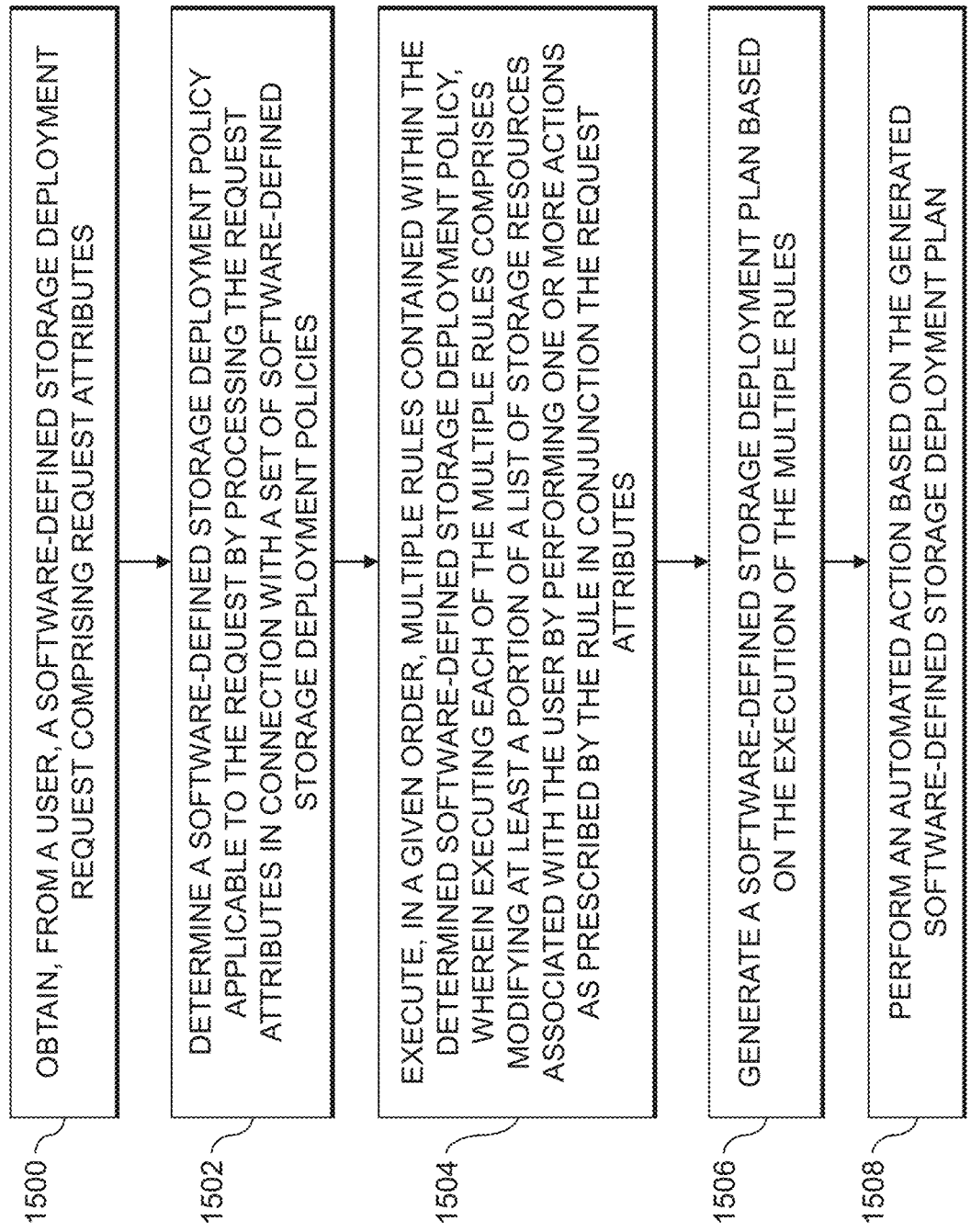
FIG. 15 is a flow diagram of a process for policy-based automated generation of software-defined storage deployments in an illustrative embodiment.

FIG. 15 is a flow diagram of a process for policy-based automated generation of software-defined storage deployments in an illustrative embodiment. It is to be understood that this particular process is only an example, and additional or alternative processes can be carried out in other embodiments.

In this embodiment, the process includes steps 1500 through 1508. These steps are assumed to be performed by the automated software-defined storage deployment system 105 utilizing its modules 112, 114, and 116.

Step 1500 includes obtaining, from at least one user, a software-defined storage deployment request comprising one or more request attributes. The one or more request attributes can include one or more of, for example, target size, one or more storage class attributes, identifying information pertaining to a storage stack to be deployed, and identifying information pertaining to one or more inventory servers.

Step 1502 includes determining a software-defined storage deployment policy applicable to the request by processing at least a portion of the one or more request attributes in connection with a set of software-defined storage deployment policies. In at least one embodiment, determining the software-defined storage deployment policy includes looking-up the policy using a map structure of policy names to an executable code structure that contains an implementation for executing the policy.

Step 1504 includes executing, in a given order, multiple rules contained within the determined software-defined storage deployment policy, wherein executing each of the multiple rules comprises modifying at least a portion of a list of storage resources associated with the at least one user by performing one or more actions as prescribed by the rule in conjunction at least a portion of the one or more request attributes. In at least one embodiment, executing the multiple rules includes executing the multiple rules in a chained fashion wherein the output of a given rule is used as at least part of an input to the subsequent rule in the given order. Also, in one or more embodiments, the multiple rules can include one or more storage resource filtering rules, one or more policy input validation rules, one or more storage resource augmentation rules, and/or one or more storage resource selection rules.

Step 1506 includes generating a software-defined storage deployment plan (e.g., deployment blueprint 1401 in FIG. 14) based at least in part on the execution of the multiple rules. In one or more embodiments, the software-defined storage deployment plan includes one or more of: an identifier indicating which software-defined storage stack to install, one or more resources that need to be created in connection with the deployment, one or more attributes required for the software-defined storage stack to install, which storage resources associated with the at least one user to use for the deployment, and what software to install in connection with the storage resources to be used for the deployment.

Step 1508 includes performing at least one automated action based at least in part on the generated software-defined storage deployment plan. In at least one embodiment, performing the at least one automated action includes outputting the generated software-defined storage deployment plan to an automated software-defined storage deployment system.

Accordingly, the particular processing operations and other functionality described in conjunction with the flow diagram of FIG. 15 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate deployment blueprints based on sequential rule execution as part of executing a determined deployment policy. These and other embodiments can effectively overcome challenges associated with unifying and simplifying deployments across a software-defined storage portfolio.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 16 and 17. Although described in the context of system 100, these platforms may also be used to implement at least portions of other information processing systems in other embodiments.

Figure 16:
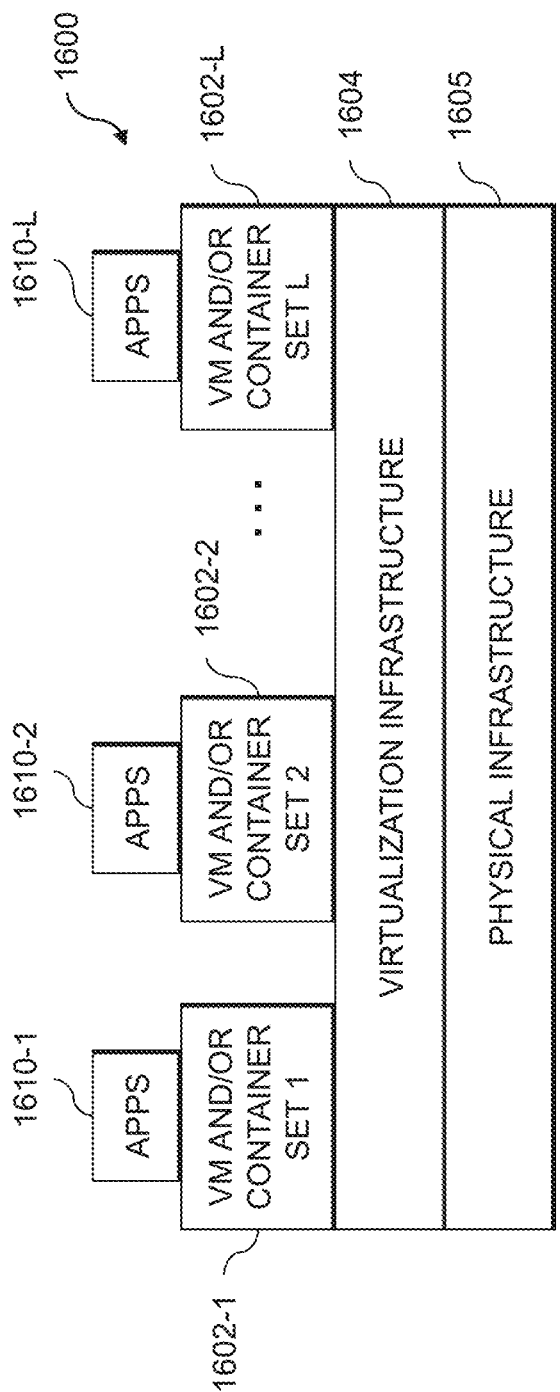
FIGS. 16 and 17 show examples of processing platforms that may be utilized to implement at least a portion of an information processing system in illustrative embodiments.
Figure 17:
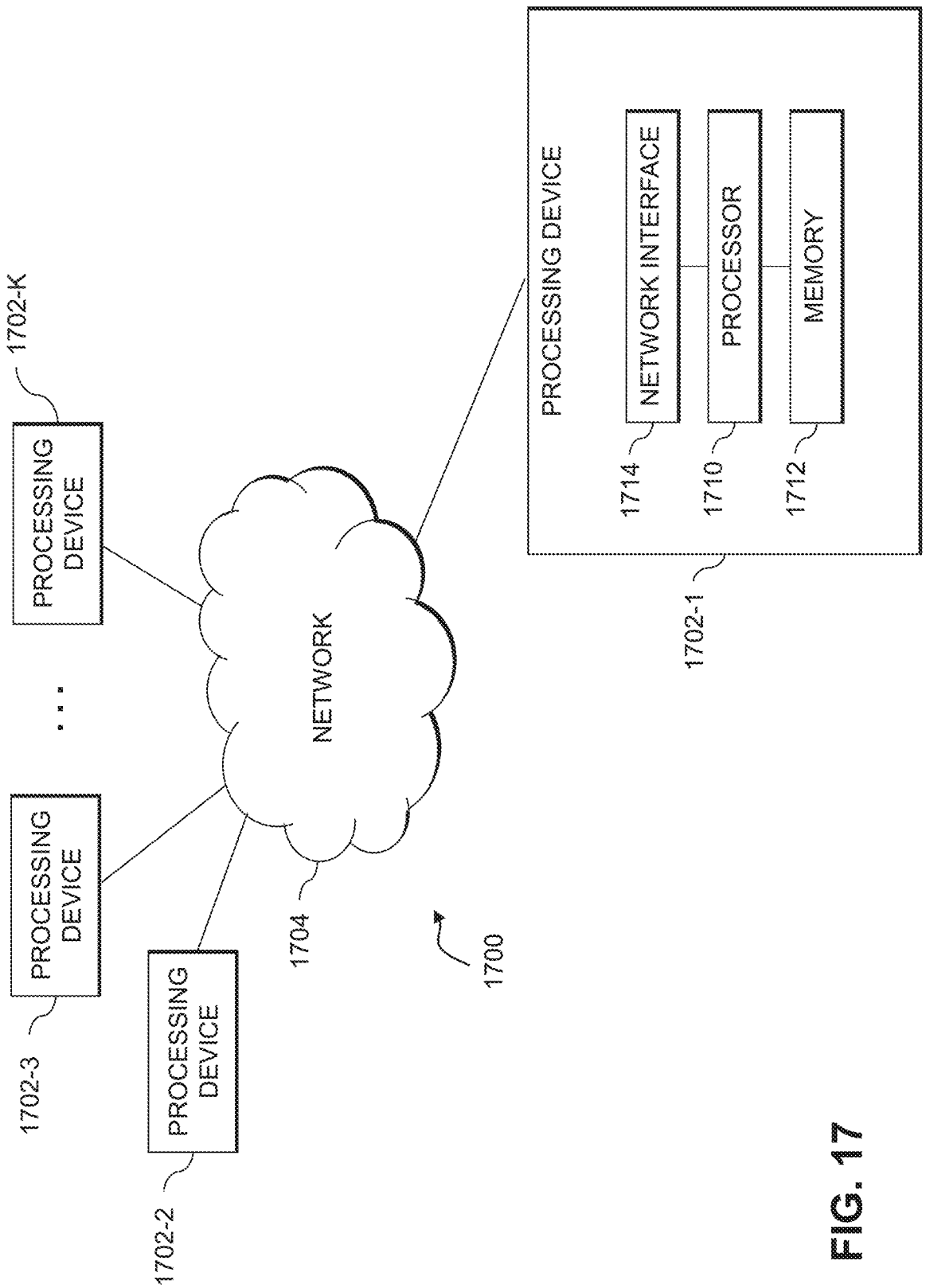

FIG. 16 shows an example processing platform comprising cloud infrastructure 1600. The cloud infrastructure 1600 comprises a combination of physical and virtual processing resources that are utilized to implement at least a portion of the information processing system 100. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 comprise respective VMs, respective sets of one or more containers, or respective sets of one or more containers running in VMs. In some implementations of the FIG. 16 embodiment, the VMs/container sets 1602 comprise respective VMs implemented using virtualization infrastructure 1604 that comprises at least one hypervisor.

A hypervisor platform may be used to implement a hypervisor within the virtualization infrastructure 1604, wherein the hypervisor platform has an associated virtual infrastructure management system. The underlying physical machines comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1702-1 in the processing platform 1700 comprises a processor 1710 coupled to a memory 1712.

The processor 1710 comprises a microprocessor, a microcontroller, an application-specific integrated circuit (ASIC), a field-programmable gate array (FPGA) or other type of processing circuitry, as well as portions or combinations of such circuitry elements.

The memory 1712 comprises random access memory (RAM), read-only memory (ROM) or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, storage systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining, from at least one user, a software-defined storage deployment request comprising one or more request attributes;
determining a software-defined storage deployment policy applicable to the request by processing at least a portion of the one or more request attributes in connection with a set of software-defined storage deployment policies, wherein determining the software-defined storage deployment policy comprises looking-up the software-defined storage deployment policy using a map structure of software-defined storage deployment policy names to an executable code structure that contains an implementation for executing the software-defined storage deployment policy;
executing, in a given order, multiple rules contained within the determined software-defined storage deployment policy, wherein executing each of the multiple rules comprises modifying at least a portion of a list of storage resources associated with the at least one user by performing one or more actions as prescribed by the rule in conjunction at least a portion of the one or more request attributes;
generating a software-defined storage deployment plan based at least in part on the execution of the multiple rules; and
performing at least one automated action based at least in part on the generated software-defined storage deployment plan;
wherein the method is performed by at least one processing device comprising a processor coupled to a memory.

2. The computer-implemented method of claim 1, wherein executing the multiple rules comprises executing the multiple rules in a chained fashion wherein the output of a given rule is used as at least part of an input to the subsequent rule in the given order.

3. The computer-implemented method of claim 1, wherein performing the at least one automated action comprises outputting the generated software-defined storage deployment plan to an automated software-defined storage deployment system.

4. The computer-implemented method of claim 1, wherein the software-defined storage deployment plan comprises one or more of: an identifier indicating which software-defined storage stack to install, one or more resources that need to be created in connection with the deployment, one or more attributes required for the software-defined storage stack to install, which storage resources associated with the at least one user to use for the deployment, and what software to install in connection with the storage resources to be used for the deployment.

5. The computer-implemented method of claim 1, wherein the one or more request attributes comprise one or more of target size, one or more storage class attributes, identifying information pertaining to a storage stack to be deployed, and identifying information pertaining to one or more inventory servers.

6. The computer-implemented method of claim 1, wherein the multiple rules comprise one or more storage resource filtering rules.

7. The computer-implemented method of claim 1, wherein the multiple rules comprise one or more policy input validation rules.

8. The computer-implemented method of claim 1, wherein the multiple rules comprise one or more storage resource augmentation rules.

9. The computer-implemented method of claim 1, wherein the multiple rules comprise one or more storage resource selection rules.

10. A non-transitory processor-readable storage medium having stored therein program code of one or more software programs, wherein the program code when executed by at least one processing device causes the at least one processing device:

to obtain, from at least one user, a software-defined storage deployment request comprising one or more request attributes;
to determine a software-defined storage deployment policy applicable to the request by processing at least a portion of the one or more request attributes in connection with a set of software-defined storage deployment policies, wherein determining the software-defined storage deployment policy comprises looking-up the software-defined storage deployment policy using a map structure of software-defined storage deployment policy names to an executable code structure that contains an implementation for executing the software-defined storage deployment policy;
to execute, in a given order, multiple rules contained within the determined software-defined storage deployment policy, wherein executing each of the multiple rules comprises modifying at least a portion of a list of storage resources associated with the at least one user by performing one or more actions as prescribed by the rule in conjunction at least a portion of the one or more request attributes;
to generate a software-defined storage deployment plan based at least in part on the execution of the multiple rules; and
to perform at least one automated action based at least in part on the generated software-defined storage deployment plan.

11. The non-transitory processor-readable storage medium of claim 10, wherein executing the multiple rules comprises executing the multiple rules in a chained fashion wherein the output of a given rule is used as at least part of an input to the subsequent rule in the given order.

12. The non-transitory processor-readable storage medium of claim 10, wherein performing the at least one automated action comprises outputting the generated software-defined storage deployment plan to an automated software-defined storage deployment system.

13. The non-transitory processor-readable storage medium of claim 10, wherein the software-defined storage deployment plan comprises one or more of: an identifier indicating which software-defined storage stack to install, one or more resources that need to be created in connection with the deployment, one or more attributes required for the software-defined storage stack to install, which storage resources associated with the at least one user to use for the deployment, and what software to install in connection with the storage resources to be used for the deployment.

14. The non-transitory processor-readable storage medium of claim 10, wherein the multiple rules comprise at least one of one or more storage resource filtering rules, one or more policy input validation rules, one or more storage resource augmentation rules, and one or more storage resource selection rules.

15. An apparatus comprising:
at least one processing device comprising a processor coupled to a memory;
the at least one processing device being configured:
to obtain, from at least one user, a software-defined storage deployment request comprising one or more request attributes;
to determine a software-defined storage deployment policy applicable to the request by processing at least a portion of the one or more request attributes in connection with a set of software-defined storage deployment policies, wherein determining the software-defined storage deployment policy comprises looking-up the software-defined storage deployment policy using a map structure of software-defined storage deployment policy names to an executable code structure that contains an implementation for executing the software-defined storage deployment policy;

to execute, in a given order, multiple rules contained within the determined software-defined storage deployment policy, wherein executing each of the multiple rules comprises modifying at least a portion of a list of storage resources associated with the at least one user by performing one or more actions as prescribed by the rule in conjunction at least a portion of the one or more request attributes;

to generate a software-defined storage deployment plan based at least in part on the execution of the multiple rules; and to perform at least one automated action based at least in part on the generated software-defined storage deployment plan.

16. The apparatus of claim 15, wherein executing the multiple rules comprises executing the multiple rules in a chained fashion wherein the output of a given rule is used as at least part of an input to the subsequent rule in the given order.

17. The apparatus of claim 15, wherein performing the at least one automated action comprises outputting the generated software-defined storage deployment plan to an automated software-defined storage deployment system.

18. The apparatus of claim 15, wherein the software-defined storage deployment plan comprises one or more of: an identifier indicating which software-defined storage stack to install, one or more resources that need to be created in connection with the deployment, one or more attributes required for the software-defined storage stack to install, which storage resources associated with the at least one user to use for the deployment, and what software to install in connection with the storage resources to be used for the deployment.

19. The apparatus of claim 15, wherein the multiple rules comprise at least one of one or more storage resource filtering rules, one or more policy input validation rules, one or more storage resource augmentation rules, and one or more storage resource selection rules.

20. The apparatus of claim 15, wherein the one or more request attributes comprise one or more of target size, one or more storage class attributes, identifying information pertaining to a storage stack to be deployed, and identifying information pertaining to one or more inventory servers.

* * * * *

UNITED STATES PATENT AND TRADEMARK OFFICE
CERTIFICATE OF CORRECTION

| | | |
|---|---|---|
| PATENT NO. | : 11,216,263 B2 | Page 1 of 1 |
| APPLICATION NO. | : 16/862786 | |
| DATED | : January 4, 2022 | |
| INVENTOR(S) | : Trevor H. Dawe, Sean R. Gallacher and Eric Young | |

It is certified that error appears in the above-identified patent and that said Letters Patent is hereby corrected as shown below:

On the Title Page

Item (57) In the Abstract, Lines 14-15, change "performing one or more actions as prescribed by the rule in conjunction the request attributes" to -- performing one or more actions as prescribed by the rule in conjunction with the request attributes --.

In the Specification

In Column 1, Lines 39-41, change "performing one or more actions as prescribed by the rule in conjunction at least a portion of the one or more request attributes" to -- performing one or more actions as prescribed by the rule in conjunction with at least a portion of the one or more request attributes --.

In the Claims

In Claim 1, Column 13, Lines 13-15, change "performing one or more actions as prescribed by the rule in conjunction at least a portion of the one or more request attributes" to -- performing one or more actions as prescribed by the rule in conjunction with at least a portion of the one or more request attributes --.

In Claim 10, Column 14, Lines 20-22, change "performing one or more actions as prescribed by the rule in conjunction at least a portion of the one or more request attributes" to -- performing one or more actions as prescribed by the rule in conjunction with at least a portion of the one or more request attributes --.

In Claim 15, Column 15, Lines 12-14, change "performing one or more actions as prescribed by the rule in conjunction at least a portion of the one or more request attributes" to -- performing one or more actions as prescribed by the rule in conjunction with at least a portion of the one or more request attributes --.

Signed and Sealed this
Twenty-ninth Day of August, 2023

Katherine Kelly Vidal
*Director of the United States Patent and Trademark Office*